(12) United States Patent
Izumi et al.

(10) Patent No.: US 10,115,494 B2
(45) Date of Patent: Oct. 30, 2018

(54) COMPOSITE BODY, HONEYCOMB STRUCTURAL BODY, AND METHOD FOR MANUFACTURING COMPOSITE BODY

(71) Applicant: NGK Insulators, Ltd., Nagoya (JP)

(72) Inventors: Yunie Izumi, Nisshin (JP); Yoshimasa Kobayashi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 432 days.

(21) Appl. No.: 14/640,594

(22) Filed: Mar. 6, 2015

(65) Prior Publication Data

US 2015/0270026 A1 Sep. 24, 2015

(30) Foreign Application Priority Data

Mar. 19, 2014 (JP) .................. 2014-055881
Mar. 4, 2015 (JP) .................. 2015-042860

(51) Int. Cl.
*B01D 46/24* (2006.01)
*C04B 35/26* (2006.01)
(Continued)

(52) U.S. Cl.
CPC ........... *H01B 1/08* (2013.01); *C04B 35/2608* (2013.01); *C04B 38/0006* (2013.01); *F01N 3/027* (2013.01); *H01M 8/2435* (2013.01); *B32B 2250/02* (2013.01); *B32B 2307/202* (2013.01); *C04B 2235/40* (2013.01);
(Continued)

(58) Field of Classification Search
None
See application file for complete search history.

(56) References Cited

U.S. PATENT DOCUMENTS 5,902,763 A * 5/1999 Waku .................... C04B 35/117
501/153
2004/0094401 A1* 5/2004 Carlow ................. F01N 3/0892
422/186.04
(Continued)

FOREIGN PATENT DOCUMENTS

JP 3891790 B2 3/2007
JP 2010520063 6/2010
(Continued)

OTHER PUBLICATIONS

Extended European Search Report (Application No. 15158093.3) dated Jul. 17, 2015.
(Continued)

*Primary Examiner* — Nicholas W. Jordan
(74) *Attorney, Agent, or Firm* — Burr & Brown, PLLC

(57) ABSTRACT

A composite body including a substrate and a forming portion which is composed of a composite phase containing a perovskite oxide and a metal oxide different from the perovskite oxide and which is formed on the substrate. The composite body may be a composite body manufactured by a manufacturing method including a forming step of firing in an oxidizing atmosphere, a laminated body in which an inorganic raw material powder containing a compound powder and a metal powder is disposed on a substrate so as to form a forming portion composed of a composite phase containing a perovskite oxide and a metal oxide different from the perovskite oxide on the substrate.

19 Claims, 4 Drawing Sheets

(51) Int. Cl.
*H01B 1/08* (2006.01)
*F01N 3/027* (2006.01)
*H01M 8/2435* (2016.01)
*C04B 38/00* (2006.01)

(52) U.S. Cl.
CPC .. *C04B 2235/6583* (2013.01); *C04B 2237/06* (2013.01); *C04B 2237/123* (2013.01); *C04B 2237/124* (2013.01); *C04B 2237/365* (2013.01); *C04B 2237/405* (2013.01); *C04B 2237/86* (2013.01); *C04B 2237/88* (2013.01); *Y02P 70/56* (2015.11); *Y10T 428/24149* (2015.01)

(56) References Cited

U.S. PATENT DOCUMENTS

| | | |
|---|---|---|
| 2008/0217382 A1 | 9/2008 | Kim et al. |
| 2009/0194223 A1 | 8/2009 | McCarthy et al. |
| 2012/0270139 A1 | 10/2012 | Park et al. |
| 2013/0148256 A1 | 6/2013 | Suzuki et al. |
| 2013/0284720 A1 | 10/2013 | Kasai et al. |
| 2014/0256534 A1* | 9/2014 | Gao .................. B01J 23/42 428/172 |

FOREIGN PATENT DOCUMENTS

| | | |
|---|---|---|
| JP | 2011-099405 A1 | 5/2011 |
| JP | 4874574 B2 | 2/2012 |
| JP | 2014-062476 A1 | 4/2014 |
| WO | 2008/115696 | 9/2008 |
| WO | 2012/086814 | 6/2012 |
| WO | 2013/049606 | 4/2013 |

OTHER PUBLICATIONS

Office Action from a corresponding Japanese patent application (JP 2015042860) bearing a mailing date of Aug. 7, 2018, 7 pages.
Office Action from a corresponding European patent application (EP 15158093.3) bearing a mailing date of Jun. 29, 2018, 4 pages.

* cited by examiner

COMPOSITE BODY, HONEYCOMB STRUCTURAL BODY, AND METHOD FOR MANUFACTURING COMPOSITE BODY

BACKGROUND OF THE INVENTION

1. Field of the Invention

The present invention relates to a composite body, a honeycomb structural body, and a method for manufacturing a composite body.

2. Description of the Related Art

Hitherto, a composite body including an electrically conductive forming portion, such as a bond body including an electrically conductive bonding portion as the forming portion or a cover body including an electrically conductive covering portion as the forming portion, has been desired. As a bonding material used for manufacturing a band body, for example, an electrically conductive bonding material containing a nickel oxide powder, a nickel metal powder, an iron oxide powder, and a vehicle has been proposed (see Patent Literature 1). In Patent Literature 1, by the use of this electrically conductive bonding material, a member is adhered and is processed at 1,000° C. or more, so that the member is bonded. In addition, as a covering material used for manufacturing a cover body, for example, a covering material containing a metal, such as copper or aluminum, or a composite material formed of $MoSi_2$ and at least one type of Si and SiC has been proposed (see Patent Literatures 2 and 3).

In addition, as an electrically conductive ceramic, a perovskite oxide has been known. As a method for manufacturing a perovskite oxide, for example, a proposal has been made in which after a combustion synthesis is performed using a reaction raw material containing a metal powder of Group IV, a carbonate salt of Group II, and sodium perchlorate, a reaction product obtained thereby is pulverized and washed with water for manufacturing (see Patent Literature 4). According to Patent Literature 4, as the condition of the combustion synthesis, an adiabatic flame temperature is set to 1,500° C. or more, and the reaction product obtained thereby includes a synthesized powder and a by-product (NaCl). In addition, when the reaction product is finely pulverized and then washed with water, the by-product can be sufficiently removed, so that a perovskite ceramic having an approximately theoretical density can be obtained by sintering.

CITATION LIST

Patent Literature

PTL 1: Japanese Patent No. 3891790
PTL 2: Japanese Unexamined Patent Application Publication No. 2011-099405
PTL 3: Japanese Unexamined Patent Application Publication No. 2014-062476
PTL 4: Japanese Patent No. 4874574

SUMMARY OF THE INVENTION

However, when a bond body is formed using the bonding material disclosed in Patent Literature 1, the electrically conductive property and the bonding property (such as adhesive property between a member to be bonded (substrate) and a banding portion (forming portion)) were not excellent in some cases. In addition, a cover body including a covering portion (forming portion) other than the covering portions disclosed in Patent Literatures 2 and 3 has been desired. In addition, when a composite body is formed using the method for manufacturing a perovskite oxide disclosed in Patent Literature 4, the electrically conductive property and/or the adhesive property between a substrate and a forming portion was not excellent in some cases. Hence, it has been desired to provide a novel composite body having more excellent electrically conductive property and adhesive property between a substrate and a forming portion.

The present invention was made to solve the problems as described above, and a primary object of the present invention is to provide a novel composite body having more excellent electrically conductive property and adhesive property between a substrate and a forming portion and a method for manufacturing the same.

Through intensive research carried out to achieve the above primary object, the present inventors conceived that for example, a raw material containing a $La_2O_3$ powder and a Cu powder is disposed on a substrate (for example, between members to be banded or on the surface of a member to be covered) and is fired in the air. In addition, it was found that by the process as described above, a composite body having more excellent electrically conductive property and adhesive property between a substrate and a forming portion can be manufactured, and as a result, the present invention was completed.

That is, a composite body of the present invention comprises:

a substrate; and
a forming portion which is composed of a composite phase containing a perovskite oxide and a metal oxide different from the perovskite oxide and which is formed on the substrate.

A honeycomb structural body of the present invention comprises the composite body described above.

A method for manufacturing a composite body of the present invention is a method for manufacturing a composite body in which a forming portion is formed on a substrate, the method comprising:

a forming step of firing a laminated body in an oxidizing atmosphere, the laminated body in which an inorganic raw material powder containing a compound powder and a metal powder is disposed on the substrate to form a forming portion formed of a composite phase containing a perovskite oxide and a metal oxide different from the perovskite oxide on the substrate.

According to the composite body of the present invention and the method for manufacturing the same, a novel composite body having more excellent electrically conductive property and adhesive property between a substrate and a forming portion can be provided. The reason for this is inferred as described below. It is inferred that, for example, in the forming portion, the electrically conductive property can be increased by the perovskite oxide, and the adhesive property between the substrate and the forming portion can be increased by the metal oxide.

DESCRIPTION OF THE PREFERRED EMBODIMENTS

A composite body of the present invention comprises a substrate and a forming portion which is composed of a composite phase containing a perovskite oxide and a metal oxide different from the perovskite oxide and which is formed on the substrate. This composite body may also be a bond body in which, for example, a first member (the substrate described above) and a second member are bonded to each other by a banding portion (the forming portion described above). In addition, this composite body may also be a cover body in which, for example, the surface of the substrate is partially or entirely covered with a covering portion (the forming portion described above). Hereinafter, the embodiments of the present invention will be described with reference to the drawings.

First Embodiment

Figure 1:
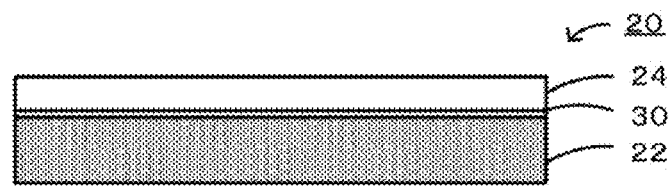
FIG. 1 is an explanatory view showing one example of a schematic structure of a bond body 20.

FIG. 1 is an explanatory view showing one example of a schematic structure of a band body 20 according to one embodiment of the composite body of the present invention. As shown in FIG. 1, the bond body 20 includes a first member 22, a second member 24, and a bonding portion 30 boding the first member 22 and the second member 24. The first member 22 and the second member 24 each may be formed of either a porous material or a dense material. In addition, the bond body 20 may be a bond body formed by bonding a porous material and a porous material, a porous material and a dense material, or a dense material and a dense material. The first member 22 and the second member 24 may be same materials or different materials.

The first member 22 and the second member 24, each of which is a member to be bonded, may be formed of a porous ceramic. The porous ceramic is not particularly limited as long as being a ceramic having a porous structure. The porous structure indicates a structure having a surface in which open pores are formed, and for example, a structure having a porosity of 10% by volume or more may be used, a structure having a porosity of 20% by volume or more is preferable, and a structure having a porosity of 40% by volume or more is more preferable. In addition, in view of easy formation, the porosity is preferably 90% by volume or less. The porosity of the porous ceramic may be appropriately selected in accordance with the application and the like. The average micropore diameter of this porous ceramic is preferably, for example, in a range of 1 to 300 μm. In this range, a perovskite oxide and/or a metal oxide forming the bonding portion is likely to intrude into the pores of the porous ceramic, and hence the bonding can be further enhanced. This average micropore diameter is more preferably 5 μm or ore and further preferably 10 μm or more. In addition, this average micropore diameter is more preferably 100 μm or less and further preferably 50 μm or less. Incidentally, the porosity and the average micropore diameter of the porous ceramic indicate the results obtained by measurement using a mercury intrusion method.

This porous ceramic may be formed, for example, to contain one of more inorganic material selected from a carbide, such as silicon carbide, titanium carbide, zirconium carbide, or boron carbide; a nitride, such as silicon nitride, aluminum nitride, titanium nitride, or zirconium nitride; an oxynitride such as sialon; a silicide such as molybdenum silicide; zirconium phosphate, and the like. In addition, the porous ceramic may be formed, for example, to contain one or more inorganic material selected from cordierite, mullite, zeolite, aluminum titanate, aluminum oxide, zirconium oxide, titanium oxide, silicon oxide, magnesium oxide, and the like. Although being not particularly limited, the shape of the porous ceramic may be selected in accordance with the application. For example, a plate shape, a cylindrical shape, and a honeycomb shape may be mentioned, and the structure through which a fluid is allowed to pass may also be used. In particular, this porous ceramic is preferably formed to have a honeycomb structural body in which a partition portion is provided to form a plurality of cells each functioning as a passage of a fluid. This porous ceramic may have, for example, an electrically conductive property. In this case, this porous ceramic is preferably formed of a composite material which contains SiC and Si banded thereto and in which this SiC and this Si form pores. Since this Si-banded SiC ceramic has an electrically conductive property, for example, a metal member functioning as an electrode may be bonded thereto in some cases, and hence, the application of the present invention is significant.

The first member 22 and the second member 24, which are the members to be bonded to each other, each may be formed of a dense material. The dense material is not particularly limited as long as being a dense member having a low porosity and may be either a metal member or a dense ceramic. The dense material may have, for example, a porosity of 5% by volume or less, a material having a porosity of 1% by volume or less is preferable, and a material having a porosity of 0.5% by mass or less is more preferably. The metal member is not particularly limited as long as being formed of a metal, such as a typical metal or a transition metal, and for example, a metal member having a highly electrically conductive property is preferable. As the transition metal, for example, a metal, such as Fe, Co, Ni, or Cu, and an alloy thereof are preferable. In addition, in accordance with the application, a noble metal, such as Pt or Au, may also be used. This metal member may also be used as an electrode, and in this case, stainless steel, such as a Cr—Ni—Fe-based alloy (SUS304) or a Cr—Fe-based alloy (SUS430), may be preferably used. This metal member is preferably an alloy containing at least Fe and Cr and is more preferably an alloy containing 70 to less than 90% by mass of Fe and 10 to less than 30% by mass of Cr. The reason for this is that the above metal member has a stable material quality and an excellent electrically conductive property. As the shape of the metal member, a plate shape or the like may be appropriately selected in accordance with the application. As the dense ceramic, for example, there may be mentioned a ceramic obtained by densely sintering any of the materials mentioned above as the porous ceramic, an impregnated member formed by filling a filler, an impregnating agent, or the like in pores of the porous ceramic, and a composite oxide member containing a plurality of metals. As the impregnated member, in particular, a Si-impregnated SiC sintered body in which pores of porous SiC are impregnated with metal Si may be mentioned by way of example. This material has a good thermally conductive property and also has a good electrically conductive property due to the presence of metal Si. In addition, as the composite oxide member, for example, there may be mentioned an electrically conductive ceramic material, such as LaCrO$_3$-based material, a BaTiO$_3$-based material, a LaMnO$_3$-based material, a LaCbO$_3$-based material, a NaCo$_2$O$_4$-based material, a Ca$_3$Co$_4$O$_9$-based material, a LaNiO$_3$-based material, or a SrTiO$_2$-based material. Incidentally, the "-based material" includes, for example, a material which is partially substituted by an alkali metal element, an alkaline earth metal, and/or an element having a different valence. In particular, as the LaMnO$_3$-based material, for example, (La$_{0.9}$Sr$_{0.1}$)MnO$_3$ may be included. Those materials mentioned above may be used as a fuel cell (such as SOFC) material, a thermoelectric element material, a sensor material, or the like.

In the first member 22 and the second member 24, each of which is to be bonded, the difference in coefficient of thermal expansion therebetween may be set to 4.0 ppm/K or more, 5.0 ppm/K or more, or 6.0 ppm/K or more. Even by a bond body formed by bonding members having relatively large difference in coefficient of thermal expansion therebetween, the bonding strength and the electrically conductive property can be maintained by a bonding portion of an oxide ceramic. In particular, in a bond body which is used so as to be repeatedly heated, the bonding strength and the electrical conductive property thereof can be maintained. For example, the coefficient of thermal expansion of a Cr—Ni—Fe-based alloy (SUS304) is 18 ppm/K, that of a Cr—Fe alloy (SUE430) is 12 ppm/K, that of a Si-bonded SiC sintered body is 4.5 ppm/K, and that of LaCrO$_3$ has 9.4 ppm/K.

The bonding portion 30 is composed of a composite phase containing a perovskite oxide and a metal oxide different the perovskite oxide and is a portion to bond the first member 22 and the second member 24. In this bonding portion 30, it is construed that since the perovskite oxide contributes to the electrically conductive property, and the metal oxide contributes to the bonding property, the electrically conductive property and the bonding property can both be obtained.

In this embodiment, besides an oxide having a perovskite structure represented by the general formula ABO$_3$, oxides each having a perovskite-related structure in which a perovskite structure and another structure are mixed together may also be collectively called the perovskite oxide. As the oxide having a perovskite-related structure, for example, an oxide having a layered perovskite structure may be mentioned. The oxide having a layered perovskite structure may be an oxide having a layered structure which is represented, for example, by the general formula A$_2$BO$_4$ and in which ABO$_3$ layers each having a perovskite structure and AO layers each having a rock salt structure are alternately laminated to each other in the c-axis direction. In the general formulas ABO$_3$ and A$_2$BO$_4$, one or more element selected from the group consisting of an alkali metal, an alkaline earth metal, and a rare earth metal may be placed at the A site. In the compounds mentioned above, a perovskite structure or a perovskite-related structure is likely to be formed. At the A site, in particular, for example, a monovalent cation, such as Li, Na, K, or Ag; a divalent cation, such as Pb, Ba, Sr, or Ca; or a trivalent cation, such as Bi, La, Ce, or Nd may be placed. At the B site, one or more type selected from transition metals may be placed. In the compounds mentioned above, a perovskite structure or a perovskite-related structure is likely to be formed. At the B site, in particular, for example, a monovalent cation, such as Li or Cu; a divalent cation, such as Mg, Ni, Zn, Cb, Sn, Fe, Od, Cu, or Cr; a trivalent cation, such as Mn, Sb, Al, Tb, In, Fe, Co, Sc, Y, or Sn; a tetravalent cation, such as Ti or Zr; a pentavalent cation, such as Nb, Sb, Ta, or Bi; or a hexavalent cation, such as W, Te or Re, may be placed. In this embodiment, the general formula may include a formula based on the chemical stoichiometric composition and a formula in which some element is partially excessive or deficient or is substituted by another element. For example, since oxygen deficiency is liable to occur in an oxide having a perovskite structure due to the influence of a synthetic atmosphere or the like, a compound represented by ABO$_{3-x}$ (0<x<3) may also be regarded as the perovskite oxide. As the perovskite oxide, for example, La$_2$CuO$_4$, SrFeO$_3$, La$_2$NiO$_4$, LaCuO$_3$, LaFeO$_3$, CaFeO$_3$, GdFeO$_3$, SrTiO$_3$, LaNiO$_3$, and (La, Sr)MnO$_3$ are preferable, and La$_2$CuO$_4$ and SrFeO$_3$ are more preferable. The reason for this is that since the electrically conductive property is good, the electrical conductivity of the bonding portion can be increased.

The metal oxide contained in the composite phase may be a metal oxide different from the above perovskite oxide and may be a single metal oxide containing one type of metal or a composite body metal oxide containing at least two or more metals. This metal oxide may include a transition metal. This metal oxide preferably contains one or more type selected from Fe, Co, Ni, Mn, Cu, Ti, V, Zr, Nb, Mo, Ta, and W and more preferably contains Fe, Ni, Mn, and/or Cu. For example, as the metal oxide, one or more of Fe$_2$O$_3$, NiO, MnO$_2$, and CuO may be mentioned. This metal oxide may or may not have an electrically conductive property.

The metal oxide contained in the composite phase preferably contains the same type of metal element as that of the metal element contained in the perovskite oxide and is more preferably a single metal oxide which contains the same type of metal element as that of the metal element placed in the B site of the perovskite oxide. As the composite phase, for example, a phase in which La$_2$CuO$_4$ is contained as the perovskite oxide and in which CuO is contained as the metal oxide, a phase in which SrFeO$_3$ is contained as the perovskite oxide and in which Fe$_2$O$_3$ is contained as the metal oxide, a phase in which La$_2$NiO$_4$ is contained as the perovskite oxide and in which NiO is contained as the metal oxide, a phase in which SrTiO$_3$ is contained as the perovskite oxide and in which TiO$_2$ is contained as the metal oxide, and a phase in which (La, Sr)MnO$_3$ is contained as the perovskite oxide and in which MnO$_2$ is contained as the metal oxide are preferable. Among those mentioned above, the phase in which La$_2$CuO$_4$ is contained as the perovskite oxide and in which CuO is contained as the metal oxide and the phase in which SrFeO$_3$ is contained as the perovskite oxide and in which Fe$_2$O$_3$ is contained as the metal oxide are more preferable. By those phases described above, the electrically conductive property and the bonding property can be further improved.

The composite phase preferably contains 5 to 45% by volume of the perovskite oxide. When the content of the perovskite oxide is set to 5% by volume or more, the electrical conductivity can be increased. In addition, when the content of the perovskite oxide is set to 45% by volume or less, the content of the metal oxide is not excessively decreased, and the bonding strength can be suppressed from being decreased. In consideration of the balance between the bonding strength and the electrical conductivity, the content of the perovskite oxide in the composite phase is more preferably 8% by volume or more and further preferably 10% by volume or more. In addition, the content thereof is more preferably 35% by volume or less and further preferably 25% by volume or less. In addition, in order to improve the bonding strength, the content of the perovskite oxide in the composite phase is preferably 5 to 25% by volume, and in order to increase the electrical conductivity, the content is preferably 25 to 45% by volume.

The composite phase preferably contains 55 to 95% by volume of the metal oxide. When the content of the metal oxide is set to 55% by volume or more, the banding strength can be increased. In addition, when the content of the metal oxide is set to 95% by volume or less, the content of the perovskite oxide is not excessively decreased, and the electrical conductivity can be suppressed from being decreased. In consideration of the balance between the bonding strength and the electrical conductivity, the content of the metal oxide in the composite phase is preferably 65% by volume or more and more preferably 75% by volume or more. In addition, the content is preferably 92% by volume or less and more preferably 90% by volume or less. In addition, in order to increase the bonding strength, the content is preferably 75 to 95% by volume, and in order to increase the electrical conductivity, the content is preferably 55 to 75% by volume.

In the banding portion 30, the porosity thereof is preferably 90% by volume or less, more preferably 50% by volume or less, and further preferably 30% by volume or less. The bonding portion 30 is more preferably a dense body in view of electrical conductivity and bonding strength. In this bonding portion 30, the porosity thereof is preferably 5% by volume or more, more preferably 10% by volume or more, and further preferably 20% by volume or more. The bonding portion 30 more preferably has pores in view of stress relaxation. A method for calculating the porosity of this bonding portion will be described. The porosity of the bonding portion is obtained by image analysis of an image of a fine structural photo taken by a SEM as described above using an image analysis software. First, a portion having an area of $0.5 \times 10^{-6}$ m$^2$ of the bonding portion is arbitrarily selected and is then binary processed, so that images of the pores are discriminated from an image of the composite phase (the phase containing the perovskite oxide and the metal oxide). The conditions in which the binary processing is performed are appropriately set in accordance with the obtained image, and for example, the values which have been experimentally obtained are generally used. By the image thus binary processed, the pores are separated from the composite phase, and the areal ratio therebetween is calculated, so that the porosity is obtained. In this case, this areal ratio of the cross section is assumed to approximately correspond to the volume ratio, so that the porosity (% by volume) is obtained.

When at least one of the first member 22 and the second member 24 is a porous material, the bonding portion 30 may intrude into the pores of the porous material. When the bonding portion 30 is configured to intrude into the pores of the porous material, it is preferable since the bonding strength can be further increased.

The bond body 20 preferably has an electrical conductivity of $10^{-4}$ S/cm or more. In addition, the electrical conductivity is more preferably $10^{-3}$ S/cm or more and further preferably $10^{-2}$ S/cm or more. As the electrical conductivity is higher, the bond body has a superior electrically conductive property, and hence, electricity can be efficiently used. It is estimated that the upper limit of this electrical conductivity is approximately 10'S/cm in consideration of the material composition. The electrical conductivity is measured by a two-terminal method using a test sample in which electrodes are bonded to the bond body by firing. This bond body is a body formed by bonding the first member and the second member each having an electrically conductive property.

The bond body 20 preferably has a high bonding property between the first member 22 and the second member 24. The high bonding property indicates that peeling at the interface of the bonding portion 30 with the first member 22 and the second member 24 and generation of cracks in the first member 22, the second member 24, and the bonding portion 30 are not observed at all. A method for evaluating the banding property will be described. The bond body is enclosed with a resin and is polished by a diamond slurry or the like so as to obtain an approximately mirror surface, so that an observation sample is formed. Next, by using a scanning electron microscope (SEM), observation is performed at a magnification of 1,500 times or more, and the peeling at the interface of the bonding portion with the first member and the second member and the generation of cracks in the first member, the second member, and the bonding portion are confirmed. Based on this observation results, the bonding property between the first member and the second member can be evaluated.

In the bond body 20, the bonding strength between the first member 22 and the second member 24 is preferably 1.5 MPa or more. The bonding strength is measured by a tensile test (in accordance with JIS-R1606). In addition, this bonding strength is more preferably 3.0 MPa or more and further preferably 5.0 MPa or more. As the bending strength is increased, the boding is increasingly enhanced, and the reliability is preferably improved.

The bond body 20 may be formed in such a way that a laminated body in which an inorganic raw material powder containing a compound powder and a metal powder is disposed between the first member 22 and the second member 24 is processed by a firing step in which firing is performed in an oxidizing atmosphere. In this step, by an oxide ceramic obtained by oxidation of the inorganic raw material powder by firing, the bonding portion 30 is formed. Although a banding temperature by the firing is set in an appropriate range in accordance with the material of the bonding portion, the bonding temperature is preferably 400° C. or more, more preferably 500° C. or more, and further preferably 600° C. or more. In addition, the bonding temperature is preferably lower than the melting point of the metal powder and is preferably 900° C. or less, more preferably 850° C. or less, and further preferably 800° C. or less. A higher bonding temperature is preferable in view of sufficient oxidation, and in view of energy consumption, a lower bonding temperature is preferable.

Figure 2:
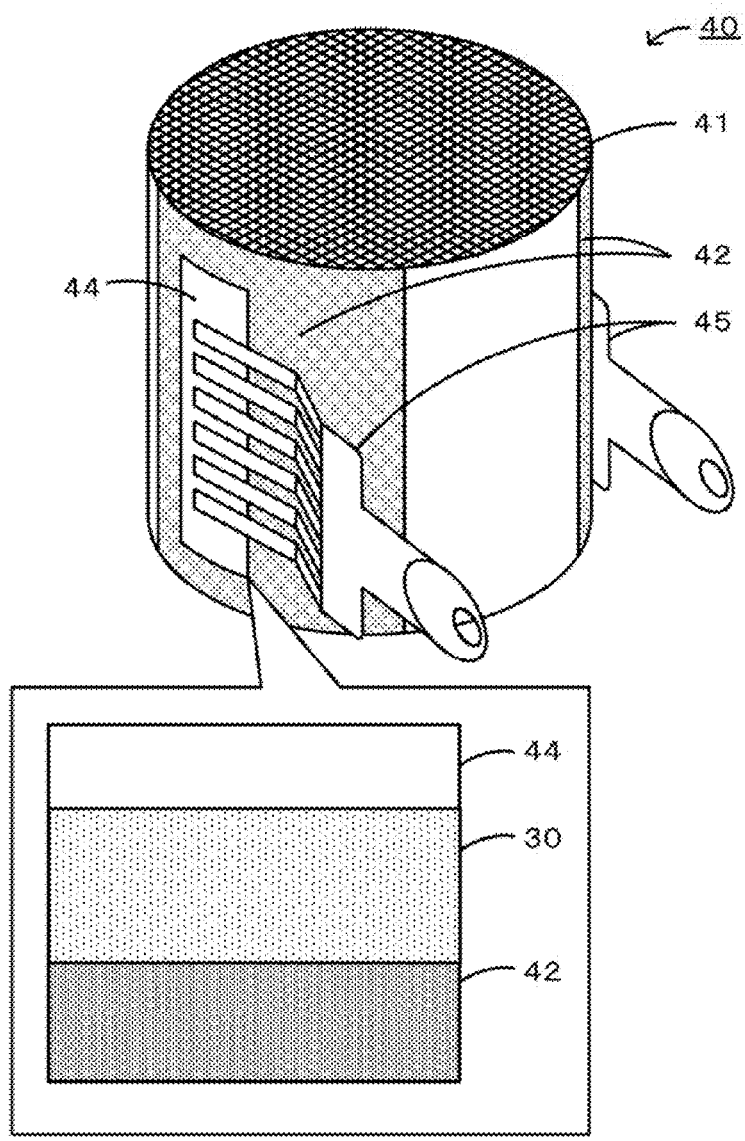
FIG. 2 is an explanatory view of a honeycomb structural body 40 which is one example of the bond body 20.

The bond body of this embodiment is not particularly limited as long as having the structure in which the first member and the second member are bonded to each other, and for example, the bond body of this embodiment may be used for a honeycomb structural body, a thermoelectric element, a ceramic heater, a gas detection sensor for oxygen and/or NOx, a fuel cell, or the like. For example, in the honeycomb structural body, the band body may be preferably used to heat a honeycomb structural body by applying a voltage to the metal member. FIG. 2 is an explanatory view of a honeycomb structural body 40 which is one example of the bond body 20 and which is one embodiment of a honeycomb structural body of the present invention. This honeycomb structural body 40 is configured so as to heat a honeycomb substrate 41 by applying a voltage between electrode terminals 45. This honeycomb structural body 40 includes the honeycomb substrate 41, highly electrically conductive porous portions 42 having a high electrical conductivity as compared to that of the honeycomb substrate 41 and each corresponding to the first member 22 (or the second member 24), metal electrodes 44 connected to the highly electrically conductive porous portions 42 and each corresponding to the second member 24 (or the first member 22), and the electrode terminals 45 connected to the metal electrodes 44. As is the above bond body 20 shown in FIG. 1, a bonding portion 30 which bands the highly electrically conductive porous portion 42 and the metal electrode 44 is composed of a composite phase containing a perovskite oxide and a metal oxide different from the perovskite oxide. In addition, the difference in electrically conductive property between the honeycomb substrate 41 and the high electrically conducive porous portion 42 may be caused by the difference in content of the metal. For example, when the honeycomb structural body is formed of a Si-bonded SiC ceramic, the content of Si in the highly electrically conductive porous portion 42 may be set to be higher.

Next, a method for manufacturing a bond body of this embodiment will be described. The method for manufacturing a bond body of this embodiment may comprises, for example, (A) a substrate forming step of forming a first member and a second member and (B) a bonding step of forming a bonding portion between the first member and the second member to bond those members to each other. In addition, when the first member and the second member are separately prepared, (A) the substrate forming step may be omitted.

(A) Substrate Forming Step

In this step, the substrate is formed. For example, when the first member and the second member are each a porous ceramic or a dense ceramic, the substrate may be formed in such a way that after raw materials are mixed together and then molded by a predetermined molding method, a molded body obtained thereby is fired. This porous ceramic may be formed, for example, to contain one or more inorganic material selected from a carbide, such as silicon carbide, titanium carbide, zirconium carbide, or boron carbide; a nitride, such as silicon nitride, aluminum nitride, titanium nitride, or zirconium nitride; an oxynitride such as sialon; a silicide such as molybdenum silicide; zirconium phosphate, and the like. In addition, the porous ceramic may be formed, for example, to contain one or more inorganic material selected from cordierite, mullite, zeolite, aluminum titanate, aluminum oxide, zirconium oxide, titanium oxide, silicon oxide, magnesium oxide, and the like. In this step, for example, by mixing an inorganic material functioning as a skeleton material, a pore forming material, and a dispersion medium, a clay or a slurry may be prepared. In this step, a raw material composition is preferably adjusted so that the porosity and the average pore diameter of the porous ceramic are in the ranges described above, that is, for example, the porosity is controlled in a range of 10% by volume or more, and the average pore diameter is controlled in a range of 1 to 300 μm. In addition, in this step, the first member and/or the second member may be formed by a process of impregnating an impregnating agent into the pores of the porous ceramic. This impregnating process may be performed for example, in such a way that after an impregnating substrate is formed on the porous ceramic, heating is then performed at a temperature at which the impregnating substrate is melted. When the porous ceramic is a Si-bonded SiC sintered body, metal Si may be used as the impregnating material.

In this step, when the first member and/or the second member is a metal member, a metal may be processed to have a predetermined shape. Although the metal member is not particularly limited as long as being formed of a metal, such as a typical metal or a transition metal, for example, a metal having a highly electrically conductive property is preferable. As the transition metal, a metal, such as Fe, Co, Ni, or Cu, or an alloy thereof is preferable. In addition, in accordance with the application, a noble metal, such as Pt or Au, may also be used. This metal member may be, for example, processed into a plate shape.

The first member and the second member formed in this step may have a difference in coefficient of thermal expansion of 6 ppm/K or more therebetween. Even in a bond body formed by banding members having a relatively large difference in coefficient of thermal expansion therebetween, by a bonding portion formed of an oxide ceramic, the bonding strength and the electrically conductive property can be maintained. In particular, even in a bond body which is used so as to be repeatedly heated, the bonding strength and the electrically conductive property can be maintained.

As for this substrate forming step, for example, the case in which a Si-bonded SiC ceramic (composite material) is formed as the porous ceramic will be described in detail. In this case, for example, a plastic clay may be formed in such a way that after a SiC powder and a Si powder are mixed together at a predetermined volume ratio, an organic binder and/or the like is added thereto together with a pore forming material and a dispersant, such as water, and kneading is then performed. As the pore forming material, a material which is burnt out after firing is preferable, and for example, a starch, a coke, or a foaming rein may be used. As the binder, for example, an organic binder, such as a cellulose-based material, may be used. As the dispersant, a surfactant, such as ethylene glycol, may be used. This porous ceramic may be formed, for example, into the honeycomb molded body having an arbitrary shape described above by extrusion molding using a mold in which a plurality of cells are arranged. The honeycomb molded body thus obtained is preferably processed by a drying treatment, a calcination treatment, and a firing treatment. The calcination treatment is a treatment in which organic material components contained in the honeycomb molded body are removed by firing at a temperature lower than a firing temperature. The firing temperature may be set to 1,400° C. to 1,500° C. and is preferably 1,430° C. to 1,450° C. Although a firing atmosphere is not particularly limited, an inert atmosphere is preferable, and an argon atmosphere is more preferable. Through the steps as described above, the honeycomb substrate (Si-banded SiC ceramic), which is a sintered body, can be obtained.

(B) Bonding Step

In this step, a bonding treatment for bonding the first member and the second member with the bonding portion is performed. The first member and the second member each may be formed of one of the members described above. This bonding step may includes, for example, (B-1) a laminated body manufacturing step of manufacturing a laminated body by disposing a raw material of the bonding portion between the first member and the second member, and (B-2) a firing step of firing the laminated body. In addition, when the laminated body in which a raw material of the bonding portion is disposed between the first member and the second member is separately prepared, (B-1) the laminated body manufacturing step may be omitted.

(B-1) Laminated Body Manufacturing Step

In this step, the raw material of the bonding portion is disposed between the first member and the second member to manufacture the laminated body. The raw material of the bonding portion contains an inorganic raw material powder containing a compound powder and a metal powder.

The compound powder preferably includes one or more type selected from the group consisting of an oxide powder, a carbonate powder, a hydroxide salt powder, and a chloride salt powder. The reason for this is that compared to a nitrate or a sulfate, those compounds mentioned above each mildly react with a metal powder, and hence the workability is preferable. Among those mentioned above, an oxide powder and a carbonate powder are more preferable. The reasons for this are that the raw material may be stably obtained at an inexpensive price, and that due to a milder reaction with a metal powder, the workability is more preferable. This compound powder is a powder of a compound containing a metal element contained in the composite phase of the above bond body and may be a single metal compound containing one type of metal element or a composite metal compound containing at least two types of metal elements. Although the metal element contained in the compound powder may be any one of elements contained in the composite phase of the above bond body, among those elements, an element contained in the perovskite oxide is preferable, and an element placed at the A site of the perovskite oxide is more preferable. As those compound powders, for example, $La_2O_3$, $SrCO_3$, $La(OH)_3$, $CaCO_3$, $CaCl_2$, $Gd(OH)_3$, and $GdCl_2$ are preferable, and $La_2O_3$ and $SrCO_3$ are more preferable. In addition, as the compound powder, although a powder of the perovskite oxide contained in the composite phase of the band body described above may be used, a step of synthesizing the perovskite oxide is required, and hence the manufacturing efficiently is degraded. As the compound powder, a powder of the metal oxide contained in the composite phase of the bond body described above may be used. The compound powder preferably has, for example, an average grain diameter of 0.05 to 50 μm. In this range, an appropriate bonding strength is likely to be obtained. In the range described above, the average grain diameter is preferably 0.1 m or more and more preferably 0.5 μm or more. In addition, the average grain diameter is preferably 30 μm or less and more preferably 15 μm or less. In addition, the average grain diameter of the inorganic raw material powder is called a median diameter (D50) which is measured by a laser diffraction/scattering grain distribution measurement apparatus using water as a dispersant.

The metal powder is a metal powder containing a metal element contained in the composite phase of the bond body described above and may be either a single metal containing one type of metal element or an alloy containing at least two types of metal elements. Although the metal element contained in this metal powder may be any one of metal elements contained in the composite phase of the bond body described above, among those metal elements, an element placed at the B site of the perovskite oxide or an element contained in the metal oxide is more preferable. As the metal elements mentioned above, Cu, Fe, Ni, Ma, Ti and the like are preferable, and Cu and Fe are more preferable. As the metal powder, for example, a powder having an average grain diameter of 1 to 40 μm is preferable. In the range described above, an appropriate bonding strength is likely to be obtained. In addition, when the average grain diameter is 1 μm or more, the reactivity is not excessively high, and easy handling can be performed. Among those mentioned above, the average grain diameter is more preferably 3 μm or more. In addition, the average grain diameter is preferably 30 μm or less and more preferably 10 μm or less.

As the inorganic raw material powder, for example, a powder containing $La_2O_3$ as the compound powder and Cu as the metal powder, a powder containing $SrCO_3$ as the compound powder and Fe as the metal powder, a powder containing $La_2O_3$ as the compound powder and Ni as the metal powder, a powder containing $CaCO_3$ as the compound powder and Fe as the metal powder, and a powder containing La $(OH)_3$ and $SrCl_2$ as the compound powder and Mn as the metal powder are preferable, and a powder containing $La_2O_3$ as the compound powder and Cu as the metal powder and a powder containing $SrCO_3$ as the compound powder and Fe as the metal powder are more preferable. When an inorganic raw material powder containing $La_2O_3$ and Cu is used, a bond body can be obtained which includes a bonding portion formed of a composite phase containing $La_2CuO_4$ as the perovskite oxide and CuO as the metal oxide. When an inorganic raw material powder containing $SrCO_3$ and Fe is used, a bond body can be obtained which includes a bonding portion formed of a composite phase containing $SrFeO_3$ as the perovskite oxide and $Fe_2O_3$, as the metal oxide.

Although the inorganic raw material powder may contain the compound powder in a range of 5 to 50% by mass, the content thereof is more preferably 10% by mass or more and further preferably 15% by mass or more. In addition, the content is more preferably 45% by mass or less and further preferably 35% by mass or less. In addition, although the inorganic raw material powder may contain the metal powder in a range of 50 to 95% by mass, the content thereof is more preferably 55% by mass or more and further preferably 65% by mass or more. In addition, the content is more preferably 90% by mass or less and further preferably 85% by mass or less.

A raw material of the bonding portion may contains, besides the inorganic raw material powder, a binder, a solvent, a dispersant, a plasticizer, and the like and may be formed, for example, into a slurry, a paste, or a clay-like material. As the binder, for example, a poly(vinyl butyral) may be preferably used. As the solvent, for example, terpineol may be preferably used.

A method for forming a laminated body by disposing the raw material of the bonding portion between the first member and the second member is not particularly limited. For example, the laminated body may be formed in such a way that by a coating method using a slurry or a paste containing the inorganic raw material powder, the slurry or the paste is applied to at least one of the first member and the second member, and the first member and the second member are laminated to each other so as to sandwich the surface to which the application is performed. By the method described above, the adhesive property of the bonding portion with the first member and/or the second member can be increased, and peeling of the bonding portion and the like can be suppressed. In addition, the laminated body may also be formed in such a way that a molded body is formed by an extrusion molding method using a clay-like material containing the inorganic raw material powder and is then disposed between the first member and the second member. In addition, the laminated body may also be formed in such a way that after the inorganic raw material powder is only disposed between the first member and the second member, the movement of the inorganic raw material powder is restricted using a mold frame or the like.

(B-2) Firing Step

In this step, the laminated body is fired in an oxidizing atmosphere.

In this firing step, the firing temperature is set in a preferable range in accordance with the material quality of the banding portion, and, for example, although the firing temperature may be set to be lower than the melting point of the metal powder, firing is preferably performed at a firing temperature of 400° C. to 900° C. When the firing temperature is 400° C. or more, the perovskite oxide is reliably synthesized. In addition, when the firing temperature is 900° C. or less, during firing, degeneration of the first member and the second member can be further suppressed. Among those mentioned above, the firing temperature is more preferably 500° C. or more and further preferably 600° C. or more. In addition, the firing temperature is more preferably 850° C. or less and further preferably 800° C. or less. The firing time is preferably 0.1 hours or more and more preferably 0.5 hours or more. In addition, the firing time is preferably 24 hours or less, more preferably 10 hours or less, and further preferably 2 hours or less.

In this firing step, although the firing atmosphere is not particularly limited as long as being an oxidizing atmosphere, the firing is preferably performed in the air. Since an oxidizing gas or the like is not required to be fed, the bond body can be more easily manufactured.

In the bond body and the manufacturing method thereof according to this embodiment thus described, since the bonding portion includes a phase of the perovskite oxide which increases the electrically conductive property and a phase of the metal oxide which increase the bonding property, a novel bond body having excellent electrically conductive property and bonding property can be provided. In addition, for example, since the composite phase forming the bonding portion is an oxide ceramic, even if the bonding portion is exposed to the air or the like at a high temperature, the material quality and the characteristics thereof are not likely to be changed. In addition, for example, in the bonding portion, since the ratio between the perovskite oxide which increases the electrically conductive property and the metal oxide which increases the bonding property can be easily changed, in accordance with the application, the electrically conductive property and the bonding property can be easily adjusted. In addition, since the bonding portion has an electrically conductive property, for example, when a first member and a second member each of which has an electrically conductive property are used, the first member and the second member can be bonded to each other so that electricity is allowed to pass therethrough. In addition, for example, since the metal powder is used as a raw material of the bonding portion, the synthesis of the perovskite oxide and the metal oxide can be simultaneously performed with the bonding between the first member and the second member thereby, and as a result, the process cost can be reduced. In addition, for example, since the ratio of the perovskite oxide and the metal oxide each contained in the composite phase may be adjusted to have a desired value by adjusting the composition of the inorganic raw material powder, a process for synthesizing the perovskite oxide and that for synthesizing the metal oxide are not required in advance for adjusting the ratio described above, and as a result, the process cost can be reduced.

Second Embodiment

Figure 3:
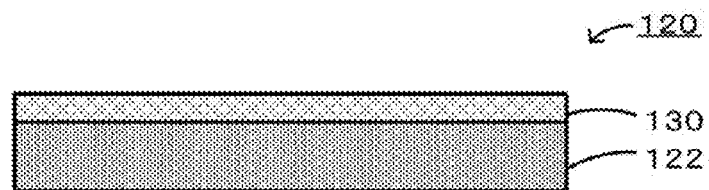
FIG. 3 is an explanatory view showing one example of a schematic structure of a cover body 120.

FIG. 3 is an explanatory view showing one example of a schematic structure of a cover body 120 according to one embodiment of the composite body of the present invention. The cover body 120 includes, as shown in FIG. 3, a substrate 122, and a covering portion 130 covering the surface of the substrate 122. The substrate 122 may be formed of either a porous material or a dense material. As the substrate 122 which is to be covered, for example, the materials described above by way of example as the first member 22 or the second member 24 may be used.

The covering portion 130 is formed of a composite phase containing a perovskite oxide and a metal oxide different from the perovskite oxide and is configured to partially or entirely cover the substrate 122. It is believed that in this covering portion 130, since the perovskite oxide contributes to the electrically conductive property and the metal oxide contributes to the adhesive property to the substrate 122, the electrically conductive property and the adhesive property between the substrate 122 and the covering portion 130 can both be obtained. The covering portion 130 may be configured similar to the bonding portion 30 described above except that the covering portion 130 covers the surface of the substrate 122 instead of bonding the first member 22 and the second member 24. When the substrate 122 is formed of a porous material, the covering portion 130 may intrude into the pores of the porous material. When the covering portion 130 is configured to intrude into the pores of the porous material, it is preferable since the adhesive strength is further enhanced.

The cover body 120 preferably has an electrical conductivity of $10^{-4}$ S/cm or more. In addition, the electrical conductivity is more preferably $10^{-3}$ S/cm or more and further preferably $10^{-2}$ S/cm or more. As the electrical conductivity is higher, the cover body has a superior electrically conductive property, and hence, electricity can be efficiently used. It is estimated that the upper limit of this electrical conductivity is approximately $10^3$ S/an in consideration of the material structure. The electrical conductivity is measured by a two-terminal method using a test sample in which electrodes are bonded to the cover body by firing. This cover body is a body formed by covering a substrate having an electrically conductive property.

The cover body 120 preferably has a high adhesive property between the substrate 122 and the covering portion 130. The high adhesive property indicates that peeling at the interface between the substrate 122 and the covering portion 130 and generation of cracks in the substrate 122 and the covering portion 130 are not observed at all. A method for evaluating the adhesive property will be described. The composite body is enclosed with a resin and is polished by a diamond slurry or the like to have an approximately mirror surface, so that an observation sample is formed. Next, by using a scanning electron microscope (SEM), observation is performed at a magnification of 1,500 times or more, and the peeling at the interface between the substrate and the covering portion and the generation of cracks in the substrate and the covering portion are confirmed. Based on this observation result, the adhesive property between the substrate and the covering portion can be evaluated.

The cover body 120 preferably has an adhesive strength of 1.5 MPa or more between the substrate 122 and the covering portion 130. The adhesive strength is measured by a tensile test (in accordance with JIS-R1606). In addition, the adhesive strength is more preferably 3.0 MPa or more and further preferably 5.0 MPa or more. As the adhesive strength is increased, the adhesion is increasingly enhanced, and the reliability is preferably improved.

The cover body 120 may be a body obtained by a firing step of firing a laminated body disposed on the surface of the substrate 122 in an oxidizing atmosphere, the laminated body containing an inorganic raw material powder which contains a compound powder and a metal powder. In this step, the covering portion 130 is formed from an oxide ceramic obtained by oxidation of the inorganic raw material powder by firing. A covering temperature by the firing may be set in a manner similar to that of the bonding temperature described above.

Figure 4:
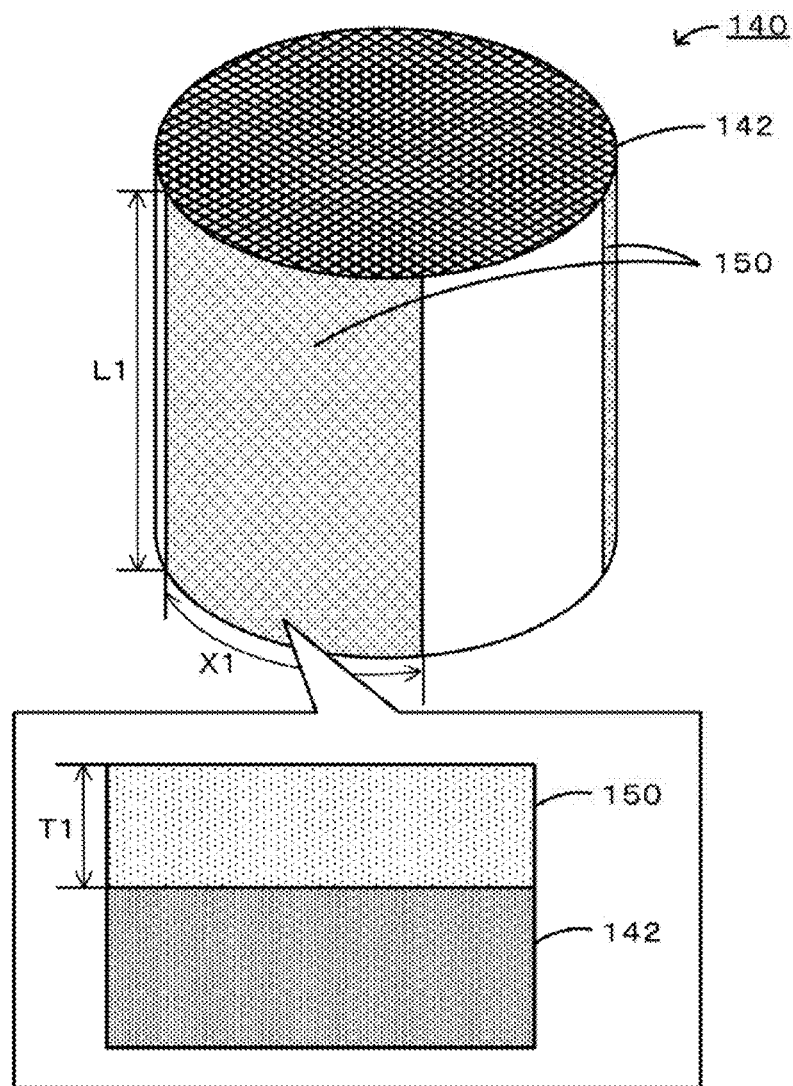
FIG. 4 is an explanatory view of a honeycomb structural body 140 which is one example of the cover body 120.

The cover body of this embodiment is not particularly limited as long as having the structure in which the surface of the substrate is covered with the covering portion, and for example, the cover body of this embodiment may be used for a honeycomb structural body, a thermoelectric element, a ceramic heater, a gas detection sensor for oxygen and/or NOx, a fuel cell, or the like. For example, in the honeycomb structural body, the cover body may be preferably used to heat the honeycomb structural body by applying a voltage to electrodes. FIG. 4 shows one example of the cover body 120 and is an explanatory view of a honeycomb structural body 140 according to one embodiment of the honeycomb structural body of the present invention. This honeycomb structural body 140 includes a honeycomb substrate 142 corresponding to the substrate 122 and electrode portions 150 each corresponding to the covering portion 130 and is configured so as to heat the honeycomb substrate 142 by applying a voltage between the electrode portions 150. The electrode portions 150 may be used as, for example, portions to which a voltage is applied through electrode terminals which are not shown. This electrode portion 150 is a portion composed of a composite phase containing a perovskite oxide covering the honeycomb substrate 142 and a metal oxide different from the perovskite oxide.

Next, a method for manufacturing a cover body of this embodiment will be described. The method of manufacturing a bond body of the present invention may comprises, for example, (A) a substrate forming step of forming a substrate and (B) a covering step of forming a covering portion on the substrate to cover the substrate. In addition, when the substrate is separately prepared, (A) the substrate forming step may be omitted.

(A) Substrate Forming Step

In this step, the substrate is formed. In this substrate forming step, a step similar to that of the substrate forming step of the first embodiment described above may be performed.

(B) Covering Step

In this step, a covering treatment in which the substrate is covered with the covering portion is performed. As the substrate, any one of the members described above may be used. This covering step may includes, for example, (B-1) a laminated body manufacturing step of manufacturing a laminated body by disposing a raw material of the covering portion an the surface of the substrate and (B-2) a firing step of firing the laminated body. In addition, when the laminated body in which the raw material of the covering portion is disposed on the surface of the substrate is separately prepared, (B-1) the laminated body manufacturing step may be omitted.

(B-1) Laminated Body Manufacturing Step

In this step, the laminated body is manufactured by disposing the raw material of the covering portion on the surface of the substrate. The raw material of the covering portion contains an inorganic raw material powder containing a compound powder and a metal powder. The raw material of the covering portion may be similar to that of the bonding portion described in the laminated body manufacturing step of the first embodiment.

A method for forming a laminated body by disposing the raw material of the covering portion on the surface of the substrate is not particularly limited. For example, the laminated body may be formed in such a way that a slurry or a paste is applied to the surface of the substrate by an application method using a slurry or a paste containing the inorganic raw material powder. By this method, the adhesive property between the substrate and the covering portion can be enhanced, and peeling of the covering portion and the like can be suppressed. In addition, the laminated body may also be formed in such a way that after a molded body is formed by an extrusion molding method or the like using a clay-like material containing the inorganic raw material powder, this molded body is disposed on the surface of the substrate. In addition, the laminated body may also be formed in such a way that after the inorganic raw material powder is only disposed an the surface of the substrate, the movement of the inorganic raw material powder is restricted using a mold frame or the like.

(B-2) Firing Step

In this step, the laminated body is fired in an oxidizing atmosphere. In this firing step, the firing conditions, such as the firing temperature, the firing time, and the firing atmosphere, are each set in a preferable range in accordance with the material of the covering portion and may be set, for example, similar to the firing conditions of the first embodiment described above.

In the cover body of this embodiment and the manufacturing method thereof described above, since the covering portion contains a phase of a perovskite oxide which increases the electrically conductive property and a phase of a metal oxide which increases the adhesive property, a novel cover body excellent in electrically conductive property and adhesive property can be provided. In addition, for example, since the composite phase forming the covering portion is formed of an oxide ceramic, even if the covering portion is exposed to the air at a high temperature, the material quality and the characteristics thereof are not likely to be changed. In addition, for example, in the covering portion, since the ratio between the perovskite oxide which increases the electrically conductive property and the metal oxide which increases the adhesive property can be easily changed, the electrically conductive property and the adhesive property can be easily adjusted in accordance with the application. In addition, for example, since the covering portion has an electrically conductive property, when a substrate having an electrically conductive property is used, electricity may be allowed to pass to the substrate through the covering portion. In addition, for example, since the metal powder is used as the raw material of the covering portion, the synthesis of the perovskite oxide and the metal oxide can be simultaneously performed with the covering of the substrate thereby, and hence, the process cost can be reduced. In addition, for example, since the ratio between the perovskite oxide and the metal oxide, which are contained in the composite phase, may be set to a desired value by adjusting the composition of the inorganic raw material powder, a process for synthesizing the perovskite oxide and that for synthesizing the metal oxide are not required in advance for adjusting the ratio described above, and as a result, the process cost can be reduced.

Incidentally, the present invention is not limited at all to the embodiments described above, and it is to be naturally understood that various modes may be performed within the technical scope of the present invention.

Figure 5:
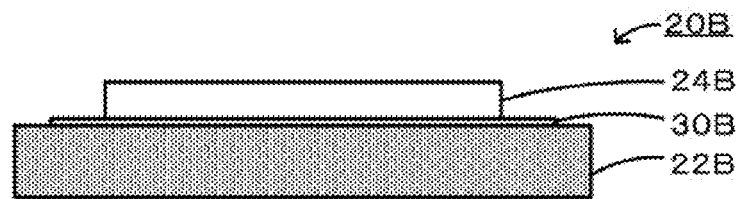
FIG. 5 is an explanatory view showing one example of a schematic structure of a bond body 20B.
Figure 6:
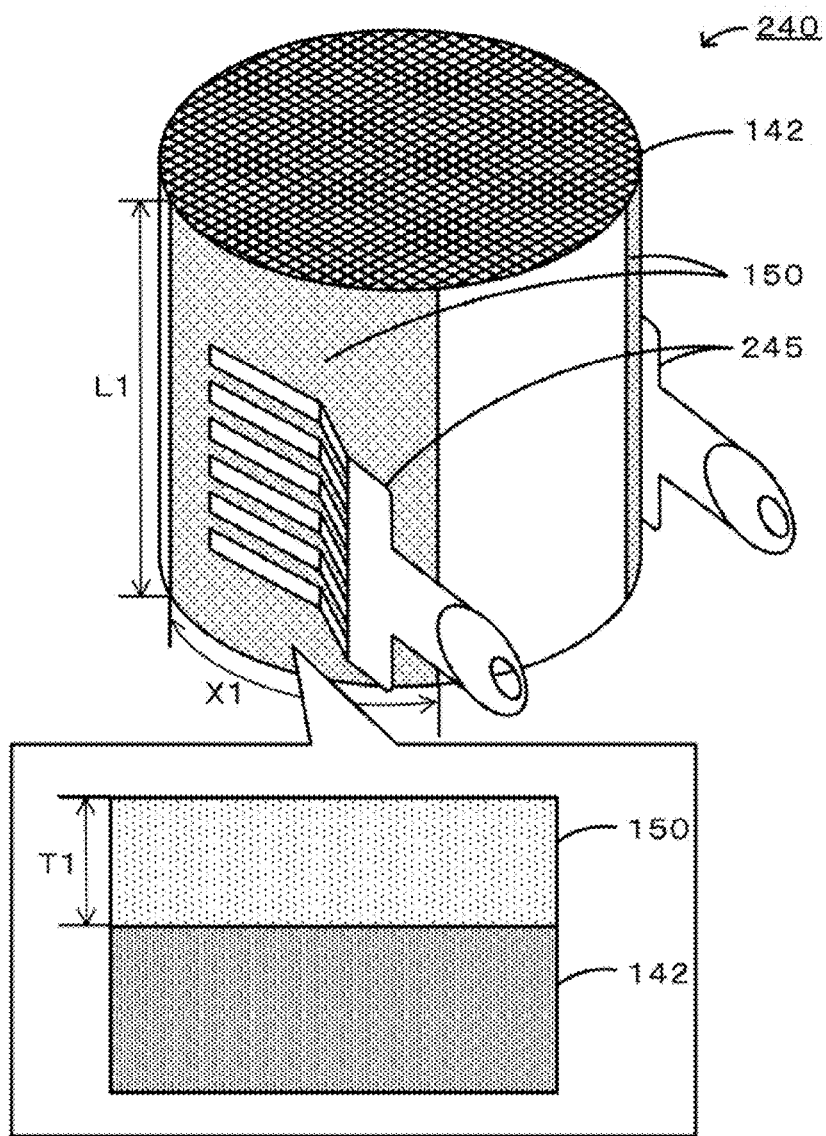
FIG. 6 is an explanatory view of a honeycomb structural body 240 which is one example of the bond body 20B.

For example, in the first embodiment, although the bond body in which the first member and the bonding portion are not exposed has been primarily described, the first member may be partially exposed, the bonding portion may be partially exposed, or both of them may also be partially exposed. For example, as shown in FIG. 5, a bond body 20B including a first member 22B, a second member 24B bonded to a part of the first member 22B, and a bonding portion 30B bonding the first member 22B and the second member 24B may be formed. In this bond body 20B, the surface of the first member 22B at a bonding portion 30B side is partially exposed, and the surface of the bonding portion 30B at a second member 24B side is partially exposed. In this case, the exposed part of the surface of the bonding portion 30B corresponds to the covering portion of the second embodiment. That is, this band body 20B may be regarded as a composite body including both a bond body having a bonding portion as the forming portion and a cover body having a covering portion as the forming portion. FIG. 6 shows one example of the composite body as described above and is an explanatory view of a honeycomb structural body 240 of one embodiment of the honeycomb structural body of the present invention. This honeycomb structural body 240 is configured in a manner similar to the honeycomb structural body 140 shown in FIG. 4 except that electrode terminals 245 are provided, and the honeycomb substrate 142 is bonded to the electrode terminals 245 by parts (bonding portions) of the electrode portions 150. In addition, although the area of the second member may be larger or smaller than or equal to that of the banding portion, the area is preferably smaller.

Figure 7:
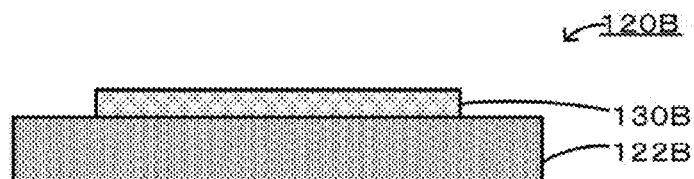
FIG. 7 is an explanatory view showing one example of a schematic structure of a cover body 120B.

For example, in the second embodiment, although the cover body in which the covering portion is formed over the entire surface of the substrate has been primarily described, the covering portion may be formed on a part of the surface of the substrate. For example, as shown in FIG. 7, a cover body 120B including a substrate 122B and a covering portion 130B formed on a part of the surface of the substrate may also be formed.

For example, in the embodiments described above, although the composite body in which the forming portion is formed on one surface of the substrate has been primarily described, a composite body may be formed in which the forming portions are formed on a plurality of surfaces of the substrate, or a composite body may also be formed in which the forming portions are formed on all the surfaces of the substrate.

For Example, in the embodiments described above, although the honeycomb structural bodies 40, 140, and 240 have been described, the honeycomb structural body of the present invention is not limited to those described above, and any honeycomb structural body including any one of the composite bodies (bond body and cover body) described above may be used. Among those described above, a honeycomb structural body (such as the honeycomb structural body 140 or 240) including a honeycomb substrate having a honeycomb structure as the substrate and electrode portions formed on the honeycomb substrate as the forming portions is preferable. When the honeycomb structural body as described above is used as an electrical heating catalyst carrier (EHC) in which electricity is allowed to pass through the electrode portions, since the electrode portions each having a predetermined composite phase are present, irregular heat generation distribution can be suppressed, so that heating can be uniformly performed, and the durability can be improved. The reason for this is believed that since the perovskite oxide and the metal oxide of the electrode portion are each a material stable at a high temperature of 1,000° C. or more in the air, and the changed in resistance is small, local and irregular heat generation can be suppressed. On the other hand, when a metal or $MoSi_2$ is used for the electrode portion as in the case disclosed in one of Patent Literature 3 and 4, oxidation starts at approximately 400° C., and the change in resistance occurs, so that local and irregular heat generation occurs. In the honeycomb structural body as described above, the dimension of the electrode portion may be appropriately determined in accordance with the dimension of the honeycomb structural body. In the honeycomb structural body of the present invention, the electrode portion may be formed on the outer surface of the honeycomb structural body so that the ratio (L1/L) of a length L1 of the electrode portion to the total length L of the honeycomb structural body in the axial direction is in a range of 0.1 to 1, and the ratio (X1/X) of a width X1 of the electrode portion to the outer circumferential length X of the plane perpendicular to the flow path of the honeycomb structural body is in a range of 0.02 to 0.3 (see FIGS. 4 and 6). When L1/L is 0.1 or more, the heat generation distribution can be made more uniform. When X1/X is 0.02 or more, the heat generation distribution can be made more uniform. In addition, when X1/X is 0.3 or less, the decrease in heat shock resistance can be more suppressed. This electrode portion may be formed so that the ratio (S1/S) of an area S1 thereof to an area S of the entire side surface is in a range of 0.002 to 0.3. For example, the length L1 (length in the direction corresponding to the axial direction of the honeycomb substrate) may be set in a range of 10 to 90 mm. In addition, the width X1 (length in the direction corresponding to the circumferential direction of the honeycomb substrate) may be set in a range of 5 to 70 mm. Those as described above are particularly preferably applied to the case in which for example, a honeycomb substrate having an outer diameter of approximately 90 mm and a length of approximately 90 mm is used. A thickness T1 of the electrode portion may be set in a range of 10 to 500 μm. In addition, in the honeycomb structural body as described above, the composite phase forming the electrode portion more preferably contains 25 to 45% by volume of the perovskite oxide. In addition, the composite phase forming the electrode portion more preferably contains 55 to 75% by volume of the metal oxide. In the electrode portion formed of the composite phase as described above, the electrical conductivity is high, and local and irregular heat generation can be further suppressed. In addition, it is believed that in the composite body of the present invention, when the structure is formed in which the electrode portions are provided on the substrate as the forming portions, and the substrate is heated by passing electricity between the electrode portions, even the structure is other than the honeycomb structural body, heat generation can be uniformly performed as is the case described above.

EXAMPLES

Hereinafter, examples of particularly forming the composite body (bond body) of the present invention and the honeycomb structural body using the same will be described as experimental examples. In addition, Experimental Examples 1 to 6, 9, and 12 to 16 correspond to the examples of the present invention, and Experimental Examples 7, 8, 10, and 11 correspond to Comparative Examples.

Manufacturing of Bond Body

Experimental Example 1

First, a Cu powder and a $La_2O_3$ powder were blended together to obtain the ratio shown in Table 1, and a binder, such as a poly(vinyl butyral) (PVB), and a solvent, such as terpineol, were further added and mixed together, so that a paste was formed. After the paste thus formed was applied to a Si-bonded SiC-made plate (porous ceramic), SUS foil (Cr—Fe-based alloy, SUS 430) (metal member) was provided on the paste described above, so that a laminated body was formed. While the laminated body was pressed by an alumina plate so that the SUS foil (the same as described above) was not peeled away, drying was performed at 80° C. for 1 hour in the air, and firing was then performed at 400° C. to 750° C. for 1 hour in the air, so that a band body of Experimental Example 1 was manufactured.

Experimental Examples 2 to 5

Except the ratio between the Cu powder and the $La_2O_3$ powder was changed as shown in Table 1, bond bodies of Experimental Examples 2 to 5 were manufactured in a manner similar to that of Experimental Example 1.

Experimental Example 6

Except a $La_2CuO_4$ powder was used instead of using the $La_2O_3$ powder, and the Cu powder and the $La_2CuO_4$ powder were blended together at the ratio shown in Table 1, a bond body of Experimental Example 6 was manufactured in a manner similar to that of Experimental Example 1.

Experimental Example 7

Except the ratio between the Cu powder and the $La_2O_3$ powder was changed as shown in Table 1, a band body of Experimental Example 7 was manufactured in a manner similar to that of Experimental Example 1.

Experimental Example 8

Except the $La_2O_3$ powder was not used, a bond body of Experimental Example 8 was manufactured in a manner similar to that of Experimental Example 1.

Experimental Example 9

Except a Fe powder and a $SrCO_3$ powder were used instead of using the Cu powder and the $La_2O_3$ powder, and the Fe powder and the $SrCuO_3$ powder were blended together at the ratio shown in Table 2, a bond body of Experimental Example 9 was manufactured in a manner similar to that of Experimental Example 1.

TABLE 1

|  | Raw material and Ratio of Blend/wt % | | | Crystal Phase and Composition Ratio/% | | 1) Bonding Property | 2) Bonding Strength | 3) Electrical Conductivity | 4) Comprehensive Evaluation |
|---|---|---|---|---|---|---|---|---|---|
|  | Cu | $La_2O_3$ | $La_2CuO_4$ | CuO | $La_2CuO_4$ | | | | |
| Experimental Example 1 | 89.1 | 10.9 | Not Used | 92.43 | 7.6 | A | A | C | C |
| Experimental Example 2 | 79.0 | 21.0 | | 85 | 15.0 | A | A | B | A |
| Experimental Example 3 | 69.5 | 30.5 | | 77.5 | 22.5 | A | A | B | A |
| Experimental Example 4 | 60.5 | 39.5 | | 70.8 | 29.2 | A | B | A | B |
| Experimental Example 5 | 52.1 | 47.9 | | 62 | 38.0 | A | C | A | C |
| Experimental Example 6 | 74.1 | Not Used | 25.9 | 80.2 | 19.8 | A | B | B | B |
| Experimental Example 7 | 83.7 | 16.3 | Not Used | 0 | 100 | F | F | A | F |
| Experimental Example 8 | 100 | 0 | | 100 | 0 | A | A | F | F |

1) A: excellent. F: failure
2) A: 5.0 MPa or more. B: 3.0 to less than 5.0 MPa. C: 1.5 to less than 3.0 MPa, F: less then 1.5 MPa
3) A: $10^{-2}$ S/cm or more. B: $10^{-3}$ to less than $10^{-2}$ S/cm, C: $10^{-4}$ to less than $10^{-3}$ S/cm, F: less than $10^{-4}$ S/cm
4) A: excellent. B: good, C: fair, F: failure

TABLE 2

|  | Raw material and Ratio of Blend/wt % | | Crystal Phase and Composition Ratio/% | | 1) Bonding Property | 2) Bonding Strength | 3) Electrical Conductivity | 4) Comprehensive Evaluation |
|---|---|---|---|---|---|---|---|---|
|  | Fe | $SrCO_3$ | $Fe_2O_3$ | $SrFeO_3$ | | | | |
| Experimental Example 9 | 72.2 | 27.8 | 72.5 | 27.5 | A | A | B | A |
| Experimental Example 10 | 27.4 | 72.6 | 0 | 100 | F | F | A | F |
| Experimental Example 11 | 100 | 0 | 100 | 0 | A | A | F | F |

1) A: excellent, F: failure
2) A: 5.0 MPa or more. B: 3.0 to less than 5.0 MPa, C: 1.5 to less than 3.0 MPa, F: less then 1.5 MPa
3) A: $10^{-2}$ S/cm or more, B: $10^{-3}$ to less than $10^{-2}$ S/cm, C: $10^{-4}$ to less than $10^{-3}$ S/cm, F: less than $10^{-4}$ S/cm
4) A: excellent, B: good, C: fair, F: failure

21

Experimental Example 10

Except the ratio between the Fe powder and the $SrCuO_3$ powder was changed as shown in Table 2, a band body of Experimental Example 10 was manufactured in a manner similar to that of Experimental Example 9.

Experimental Example 11

Except the $SrCuO_3$ powder was not used, a bond body of Experimental Example 11 was manufactured in a manner similar to that of Experimental Example 9.

(Identification of Crystal Phase of Bonding Portion)

By the use of the above bond body thus formed, the crystal phase of the bonding portion was indentified. For this measurement, a rotating anticathode type X-ray diffraction apparatus (RINT, manufactured by Rigaku Corporation) was used, a measurement sample was prepared by removing the metal member from the bond body manufactured as described above to expose the bonding portion, and an X-ray diffraction pattern of the surface of the bonding portion was obtained. As the X-ray diffraction measurement conditions, a CuKα line source, a voltage of 50 kV, an ampere of 300 mA, and 2θ of 20° to 60° were used. In addition, the X-ray diffraction data thus obtained was analyzed using "X-ray data analysis software JAE7" manufactured by MDI.

(Component Ratio of Crystal Phase)

By the use of the bond body manufactured as described above, the component ratio of the crystal phase was analyzed. The analysis was performed using a SEM (scanning electron microscope)-EDX apparatus. In particular, the bond body enclosed with a resin was mirror-surface polished with a diamond slurry to form an observation sample, and the polished cross-sectional surface of the banding portion of this sample was observed by SEM-EX at a magnification of 1,500 times to obtain a reflective electron image. Subsequently, by the use of this image, calculation was performed by an image analysis. As the image analysis software, Image-Pro0.5J was used. A region having an area of 0.5×$10^{-6}$ m was arbitrarily selected from the microtextural photo and was then binary processed, so that $La_2CuO_4$ (or $SrFeO_3$), which was an electrically conductive phase, was discriminated from CuO (or $Fe_2O_3$) which was a mother phase. By the image thus discriminated, the electrically conductive phase was separated from the mother phase, and the ratio was calculated, and this ratio was regarded as the component ratio.

(Bonding Property)

The banding property of the band body was evaluated by SEM observation of the cross section of the bond body. The band body formed as described above was enclosed with a resin and was then polished with a diamond slurry or the like to have an approximately mirror surface, so that an observation sample was formed. Next, by the use of a SEM, observation was performed at a magnification of 1,500 times or more, so that peeling between the bonding portion and each of the porous ceramic and the metal member was confirmed, and generation of cracks in the porous ceramic, the metal member, and the bonding portion were also confirmed. Subsequently, the evaluation was performed based on the following criteria. The case in which the peeling and the generation of cracks were not observed was ranked as "A (excellent)", and the case in which remarkable peeling or generation of cracks was observed was ranked as "F (failure)".

22

(Bonding Strength)

The bonding strength of the bond body was evaluated by a tensile test (in accordance with JIS-R1606). The case in which the bonding strength was 5.0 MPa or more was ranked as "A (excellent)", the case in which the bonding strength was 3.0 to less than 5.0 MPa was ranked as "B (good)", the case in which the bonding strength was 1.5 MPa to less than 3.0 MPa was ranked as "C (fair)", and the case in which the bonding strength was less than 1.5 MPa was ranked as "F (failure)".

(Electrical Conductivity)

Figure 8:
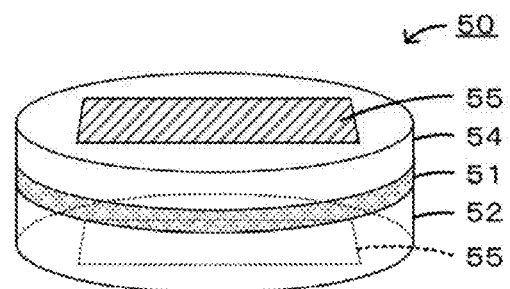
FIG. 8 is an explanatory view of a bond body 50.

The evaluation of the electrical conductivity of the bond body was performed using a bond body 50 shown in FIG. 8. As shown in FIG. 8, after a disc-shaped porous ceramic 52 and a disc-shaped metal member 54 were bonded to each other with a banding portion 51 to form a disc having a diameter of 15 mm, a Ag paste was printed thereto by baking to form electrodes 55, and by the use of the measurement sample thus formed, measurement was performed by a two-terminal method. Subsequently, the evaluation was performed based on the following criteria. The case in which the electrical conductivity thus obtained was $10^{-2}$ S/cm or more was ranked as "A (excellent)", the case in which the electrical conductivity was $10^{-3}$ S/an to less than $10^{-2}$ S/cm was ranked as "B (good)", the case in which the electrical conductivity was $10^{-4}$ S/cm to less than $10^{-3}$ S/an was ranked as "C (fair)", and the case in which the electrical conductivity was less than $10^{-4}$ S/cm or was not measurable was ranked as "F (failure)".

(Comprehensive Evaluation)

In accordance with the above evaluation results, the comprehensive evaluation of each sample was performed. In this comprehensive evaluation, the case in which the bonding strength was ranked as "A" and the electrical conductivity was ranked as "B" was evaluated as "A (excellent)". The case in which the bonding strength was ranked as "B" and the electrical conductivity was ranked as "B" was evaluated as "B (good)". The case in which the bonding strength was ranked as "C" and the electrical conductivity was ranked as "B" was evaluated as "C (fair)". The case in which the bonding strength was ranked as "F" and the case in which the electrical conductivity was ranked as "F" were each evaluated as "F (failure)".

Figure 9:
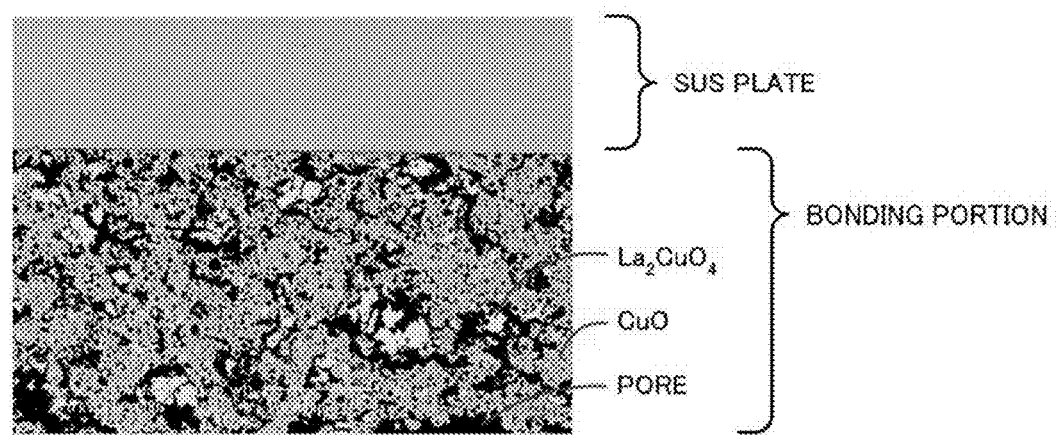
FIG. 9 is a SEM photo showing a cross section of a metal member and a bonding portion of Experimental Example 2.

FIG. 9 shows a SEM photo of the cross section of the metal member and the bonding portion in Experimental Example 2. In Experimental Example 2, when the cross section of the bonding portion was observed, as shown in FIG. 9, it was found that the phase of $La_2CuO_4$, which was a perovskite oxide, was present in a dispersed state in the phase of CuO which was the metal oxide.

In addition, in Tables 1 and 2, the crystal phase and the composition ratio of the bonding portion, the bonding property, the bonding strength, the electrical conductivity, and the comprehensive evaluation of each of the bond bodies of Experimental Examples 1 to 11 are shown. From the results of Experimental Examples 1 to 11, in Experimental Examples 1 to 6 and 8 in which the inorganic raw material powder containing 10 to 50% by mass of the compound powder ($La_2O_3$ or $SrCO_3$) and 50 to 90% by mass of the metal powder (Cu or Fe) was used, the presence of the perovskite oxide and that of the metal oxide different from the perovskite oxide were both confirmed in the bonding portion, and in the bond bodies described above, the bonding property, the bonding strength, and the electrical conductivity were all excellent. Among those described above, the bond body in which the ratio of the perovskite oxide was high had an excellent electrical conductivity, and the bond body in which the ratio of the metal oxide was high had excellent banding property and bonding strength. In addition, in Experimental Examples 1 to 11, although the bond body formed by bonding the porous ceramic functioning as the first member and the metal member functioning as the second member with the bonding portion provided therebetween was examined, it was inferred that by a cover body in which the surface of a porous ceramic functioning as the substrate is covered with a covering portion and a cover body in which the surface of a metal member functioning as the substrate is covered with a covering portion, results similar to those described above can also be obtained. That is, in the bond body having an excellent bonding property, since the bonding property between the first member and the bonding portion and the banding property between the second member and the bonding portion are both excellent, it is inferred that the bonding property between the substrate and the covering portion of the cover body including a part of the above structure is also excellent. In addition, in the bond body having an excellent bonding strength, since the adhesive strength between the first member and the bonding portion and the adhesive strength between the second member and the bonding portion are both excellent, it is inferred that the adhesive strength of the cover body including a part of the above structure is also excellent. In addition, in the bond body having an excellent electrical conductivity, since the electrical conductivities at the interfaces of the bonding portion with the first member and the second member are all excellent, it is inferred that the electrical conductivity of the cover body including a part of the above structure is also excellent.

Manufacturing of Honeycomb Structural Body

Experimental Examples 12 to 16

First, a Cu powder and a $La_2O_3$ powder were blended with each other at the same ratio as that shown in Experimental Example 4, and a binder, such as a poly(vinyl butyral), and a solvent, such as terpineol, were further added and mixed together, so that a paste was formed. The paste thus formed was printed on the surface of a Si-bonded SiC-made honeycomb substrate (porous ceramic) having a diameter of 90 mm and a length of 75 m so as to have the following dimensions shown in Table 3, and SUS-made electrode terminals (Cr—Fe-based alloy, SUS430) (metal members) were placed on the paste, so that a laminated body was formed. After the laminated body was dried at 80° C. for 1 hour in the air while the SUS-made electrode terminals were pressed by aluminum plates so as not to be peeled away, firing was performed at 750° C. for 1 hour in the air, so that honeycomb structural bodies of Experimental Examples 12 to 16 were formed. In addition, in the honeycomb structural bodies of Experimental Examples 13 to 16, the electrode terminals 245 were bonded to the honeycomb substrate 142 with parts (bonding portions) of the electrode portions 150, and the honeycomb substrate 142 was covered with the other parts (covering portions) of the electrode portions 150, so that the honeycomb structural body 240 (shown in FIG. 6) was formed. In addition, in the honeycomb structural body of Experimental Example 12, except that the honeycomb substrate 142 was not covered with the electrode portions 150 (but bonded thereto), the honeycomb structural body was formed in a manner similar to that of Experimental Examples 13 to 16.

TABLE 3

| Experimental Example | Crystal Phase of Electrode Portion and Composition Ratio/% CuO | Crystal Phase of Electrode Portion and Composition Ratio/% $La_2CuO_4$ | Dimension of Electrode Portion Thickness μm | Dimension of Electrode Portion Width mm | Dimension of Electrode Portion Length mm | Electrical Conductivity of Electrode Portion 1) before Heat Resistance Test | Electrical Conductivity of Electrode Portion 1) after Heat Resistance Test | Electrical Resistance of Honeycomb Structural Body before Heat Resistance Test Ω | Electrical Resistance of Honeycomb Structural Body Change before and after Heat Resistance Test 2) | Local Heat Generation of Honeycomb Structural Body before Heat Resistance Test | Local Heat Generation of Honeycomb Structural Body after Heat Resistance Test |
|---|---|---|---|---|---|---|---|---|---|---|---|
| Experimental Example 12 | 70.8 | 29.2 | Not Covered (Only Bonded) | | | | | 9.0E+01 | A | Presence | Presence |
| Experimental Example 13 | | | 200 | 15 | 40 | A | A | 6.0E+01 | A | Absence | Absence |
| Experimental Example 14 | | | 100 | 15 | 65 | A | A | 6.0E+01 | A | Absence | Absence |
| Experimental Example 15 | | | 100 | 30 | 65 | A | A | 6.5E+01 | A | Absence | Absence |
| Experimental Example 16 | | | 200 | 15 | 65 | A | A | 6.0E+01 | A | Absence | Absence |

1) A: $10^{-2}$ S/cm or more, B: $10^{-3}$ to less than $10^{-2}$ S/cm, C: $10^{-4}$ to less than $10^{-3}$ S/cm. F: less than $10^{-4}$ S/cm
2) A: change in electrical resistance (=electrical resistance after heat resistance test/electrical resistance before heat resistance test) is less than 10. F: change in electrical resistance is 10 or more (Heat Resistance Test)

By the use of the honeycomb structural bodies of Experimental Examples 12 to 16, electricity was allowed to pass through the electrode terminals to heat the honeycomb substrate to 800° C., and the temperature was maintained for 24 hours.

(Electrical Conductivity of Electrode Portion)

By the use of the honeycomb structural bodies of Experimental Examples 12 to 16, before and after the heat resistance test described above, the electrical conductivity of the electrode portion was measured as described below. A Ag paste (4922N manufactured by du Pont) was applied to two places of the electrode portion 150 and then dried to form areas each having a diameter of 2 mm, so that electrodes for measurement of the electrical conductivity were formed. Terminals were pressed to the measurement electrodes thus formed, and the electrical resistance was measured by a direct-current two-terminal method. From a measured electrical resistance R (Ω), an area S of the measurement electrode (cm$^2$), and a distance L (cm) between the electrodes, the volume resistivity r (Ω·cm) was calculated using the equation of r=R×S/L, and the electrical conductivity ρ (Scm$^{-1}$) of the electrode portion was calculated by the equation of ρ=1/R. Subsequently, the evaluation was performed by the following criteria. The case in which the electrical conductivity was 10$^{-2}$ S/an or more was ranked as "A (excellent)", the case in which the electrical conductivity was 10$^{-3}$ S/cm to less than 10$^{-3}$ S/an was ranked as "B (good)", the case in which the electrical conductivity was 10$^{-4}$ S/cm to less than 10$^{-3}$ S/an was ranked as "C (fair)", and the case in which the electrical conductivity was less than 10$^4$ S/an or was not measurable was ranked as "F (failure)".

(Electrical Resistance of Honeycomb Structural Body)

By the use of the honeycomb structural bodies of Experimental Examples 12 to 16, before and after the heat resistance test described above, the electrical resistance was measured as described below. The SUS-made electrode terminal was held by a crocodile clip, and the measurement was performed by a direct-current two-terminal method. In addition, the change in electrical resistance before and after the heat resistance test (=electrical resistance (Ω) after heat resistance test/electrical resistance (Ω) before heat resistance test) was obtained. A change of less than 10 was ranked as "A (excellent)", and a change of 10 or more was ranked as "F (failure)".

(Presence or Absence of Local Heat Generation)

By the use of the honeycomb structural bodies of Experimental Examples 12 to 16, before and after the heat resistance test described above, the presence or absence of local heat generation of the honeycomb structural body was evaluated as described below. After the SUS-made electrode terminal was held by a crocodile clip, and an electrical power of 2.25 kW was fed for 30 seconds, the temperature distribution of the end surface and that of the outer wall surface of the honeycomb structural body were observed using an infrared thermography. The case in which in the temperature distribution image, when a position which was different from a continuous distribution curve and which showed a temperature difference of 300° C. or more was observed, it was evaluated that local heat generation occurred.

As shown in Table 3, compared to Experimental Example 12 in which the honeycomb substrate was not covered with the electrode portions, in Experimental Examples 13 to 16 in which the honeycomb substrate was covered with the electrode portions, the electrical resistance of the honeycomb structural body was low, and the local heat generation of the honeycomb structural body was not observed before and after the heat resistance test. From the results thus obtained, it was found that the honeycomb structural body preferably includes the forming portion (in particular, covering portion) of the present invent ion.

The present application claims priority from Japanese Patent Application No. 2014-055881 filed on Mar. 19, 2014, and Japanese Patent Application No. 2015-042860 filed on Mar. 4, 2015, the entire contents of which are incorporated herein by reference.

What is claimed is:

1. A honeycomb structural body comprising:
   a substrate; and
   a forming portion formed on the substrate and being composed of a composite phase,
   wherein the composite phase is an oxide ceramic containing a perovskite oxide and a metal oxide different from the perovskite oxide, the metal oxide contained in the composite phase being a single metal oxide containing the same metal element as that of the metal element at the B site of the perovskite oxide.

2. The honeycomb structural body according to claim 1, comprising:
   a first member functioning as the substrate,
   a second member; and
   the forming portion functioning as a bonding portion bonding the first member and the second member.

3. The honeycomb structural body according to claim 2, wherein the bonding portion has a partially exposed surface at the side of the second member.

4. The honeycomb structural body according to claim 2, wherein the composite phase contains 5 to 45% by volume of the perovskite oxide.

5. The honeycomb structural body according to claim 2, wherein the composite phase contains La$_2$CuO$_4$ as the perovskite oxide and CuO as the metal oxide or contains SrFeO$_3$ as the perovskite oxide and Fe$_2$O$_3$ as the metal oxide.

6. The honeycomb structural body according to claim 1, wherein the composite phase contains 5 to 45% by volume of the perovskite oxide.

7. The honeycomb structural body according to claim 1, wherein the composite phase contains 55 to 95% by volume of the metal oxide.

8. The honeycomb structural body according to claim 1, wherein the composite phase contains La$_2$CuO$_4$ as the perovskite oxide and CuO as the metal oxide or contains SrFeO$_3$ as the perovskite oxide and Fe$_2$O$_3$ as the metal oxide.

9. The honeycomb structural body according to claim 1, having an electrical conductivity of 10$^{-4}$ S/cm or more.

10. The honeycomb structural body according to claim 1, wherein an adhesive strength between the substrate and the forming portion is 3.0 MPa or more.

11. The honeycomb structural body according to claim 1, which is obtained by firing a laminated body in an oxidizing atmosphere, the laminated body in which an inorganic raw material powder containing a compound powder and a metal powder is disposed on the substrate.

12. The honeycomb structural body according to claim 1, wherein the substrate is a honeycomb substrate having a honeycomb structure, and
   the forming portion is an electrode portion formed on the honeycomb substrate.

13. A method for manufacturing the honeycomb structural body according to claim 1, the method comprising:
   a forming step of firing a laminated body in an oxidizing atmosphere, the laminated body in which an inorganic raw material powder containing a compound powder and a metal powder is disposed on the substrate to form the forming portion composed of the composite phase.

14. The method for manufacturing the honeycomb structural body according to claim 13, wherein the method comprises a bonding step in which the inorganic raw material powder containing the compound powder and the metal powder is disposed between the substrate functioning as a first member and a second member to form the forming portion functioning as a bonding portion which is composed of the composite phase and which bonds the first member and the second member.

15. The method for manufacturing the honeycomb structural body according to claim 13, wherein the compound powder includes one or more type selected from the group consisting of an oxide powder, a carbonate powder, a hydroxide salt powder, and a chloride salt powder.

16. The method for manufacturing the honeycomb structural body according to claim 13, wherein the inorganic raw material powder contains 5 to 50% by mass of the compound powder and 50 to 95% by mass of the metal powder.

17. The method for manufacturing the honeycomb structural body according to claim 13, wherein the oxidizing atmosphere is an air atmosphere.

18. The method for manufacturing the honeycomb structural body according to claim 13, wherein the firing is performed at a firing temperature of 400° C. to 900° C.

19. The method for manufacturing the honeycomb structural body according to claim 13, wherein the inorganic raw material powder contains $La_2O_3$ as the compound powder and Cu as the metal powder or contains $SrCO_3$ as the compound powder and Fe as the metal powder.

* * * * *